United States Patent

Hakala et al.

[11] Patent Number: 5,734,135
[45] Date of Patent: Mar. 31, 1998

[54] PROCEDURE FOR STARTING AN ELEVATOR

[75] Inventors: Harri Hakala; Jorma Mustalahti, both of Hyvinkää; Esko Aulanko, Kerava, all of Finland

[73] Assignee: Kone Oy, Helsinki, Finland

[21] Appl. No.: 535,957

[22] Filed: Sep. 28, 1995

[30] Foreign Application Priority Data

Sep. 30, 1994 [FI] Finland .................. 944583

[51] Int. Cl.$^6$ .................. B66B 1/34; H02P 1/46; H02P 1/50; H02P 3/18

[52] U.S. Cl. .................. 187/292; 187/290; 318/719; 318/722

[58] Field of Search .................. 187/292, 296; 318/716, 717, 719, 721, 722, 723, 430, 432, 433, 482, 485, 461

[56] References Cited

U.S. PATENT DOCUMENTS

| | | | |
|---|---|---|---|
| 3,737,747 | 6/1973 | Krauer | 318/178 |
| 4,763,058 | 8/1988 | Heining et al. | 318/807 |
| 4,852,694 | 8/1989 | Arbori et al. | 187/115 |

FOREIGN PATENT DOCUMENTS 3838579  5/1989  Germany.

OTHER PUBLICATIONS

Abstract of Japanese Publication No. JP 2041689, *Patent Abstracts of Japan*, vol. 14, No. 200 (E–0920), Apr. 24, 1990.

Abstract of Japanese Publication No. JP 60–141185, *Patent Abstracts of Japan*, vol. 009, No. 305 (E–363), Dec. 3, 1985.

*Primary Examiner*—Robert Nappi

[57] ABSTRACT

In a system for starting elevator machinery driven by a synchronous motor, current is fed to the motor by a frequency converter and a traction sheave is connected to the motor to move the elevator car with hoisting ropes. The angle of the magnetic field of the stator is determined when the elevator stops. When the motor is started again, a new value of the angle of the magnetic field of the stator is determined on the basis of the change in the load signal. The frequency converter is adjusted so that a magnetic field whose direction corresponds to the new angle of the magnetic field of the stator is generated in the motor.

17 Claims, 2 Drawing Sheets

PROCEDURE FOR STARTING AN ELEVATOR

The present invention relates to a procedure for starting elevator machinery.

BACKGROUND OF THE INVENTION

When elevator machinery is started as the elevator car leaves a landing, the car must start moving smoothly, without sudden changes in speed or acceleration. At the instant of starting, the elevator machinery must be able to produce a torque corresponding to the load of the elevator. This can be achieved e.g. by adjusting the brake and the elevator motor so that a sufficient torque appears on the shaft of the traction sheave.

When the elevator motor is a synchronous motor, especially one using permanent magnets, adjusting the torque to the correct value is only possible if the rotor angle is known. Determining the rotor angle again requires an angle measuring apparatus, which, together with the additional equipment needed, involves significant expenses, especially in the case of small elevators. On the other hand, in practice it is quite difficult to implement a jerk-free start by adjusting the brake.

SUMMARY OF THE INVENTION

The object of the present invention is to present a new solution for the starting of elevator machinery using a synchronous motor. To implement the invention, the procedure of the invention is characterized by the features presented below.

At the moment of starting, an elevator control unit controlling an elevator motor knows the actual value of the rotor angle without requiring a separate angle measuring unit. All the data needed for the start are available in the elevator or in its machinery from information that has to be determined anyway. A sufficiently smooth start is advantageoulsy achieved without the use of complex regulating circuits. Furthermore, in a motor controlled by the method of the invention, the direction and magnitude of the magnetic fields are correct to enable the torque needed at the start to be generated.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

In the following, the invention is described in detail by referring to the drawings, which are given by way of illustration only, and thus are not limitative of the present invention, and wherein.

DESCRIPTION OF THE PREFERRED EMBODIMENTS

Figure 1:
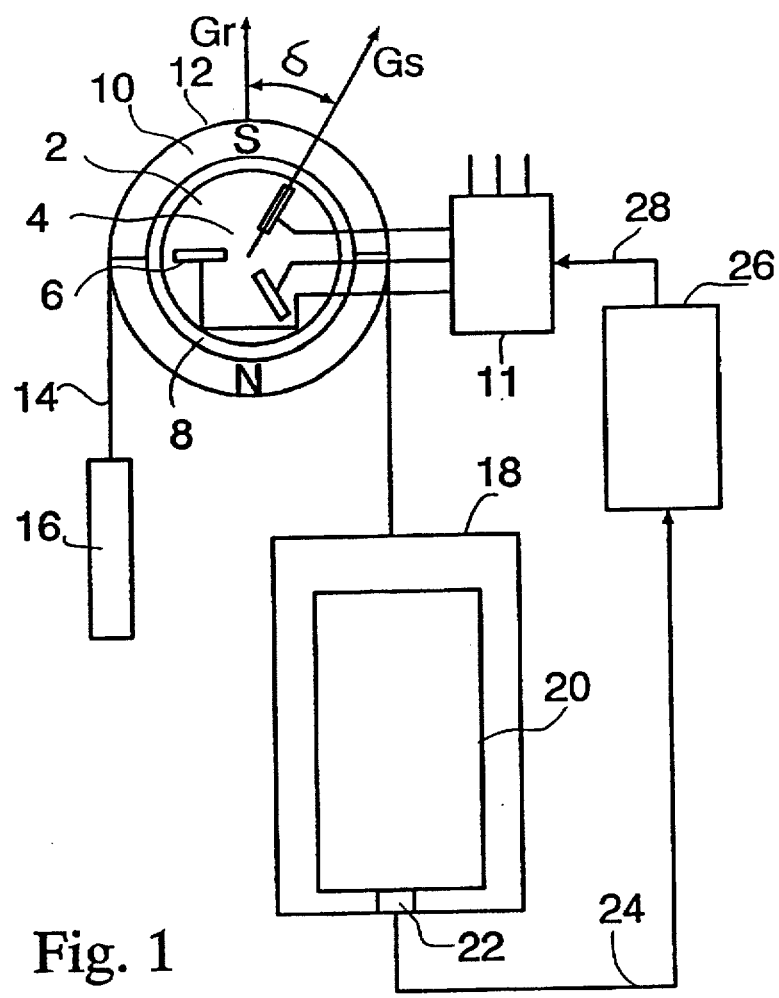
FIG. 1 is a diagrammatic representation of an elevator machinery.

FIG. 1 presents a diagrammatic view of an elevator machinery, showing only those parts of the elevator that are necessary for an understanding and application of the invention. The machinery comprises a synchronous motor 2 having a stator 4 with stator windings 6 and a rotor 10 mounted outside it, with an air gap 8 between them. The figure depicts a radial air gap, but an axial air gap would be equally possible. The stator winding is implemented as a three-phase winding formed in a manner known in itself and it is fed by a controlled frequency converter 11. The motor speed is controlled by varying the output frequency of the frequency converter 11. The rotor is provided with permanent magnets, forming magnetic poles N and S. Mounted on the circumference of the rotor is a traction sheave 12, and the hoisting ropes 14 of the elevator are fitted in grooves provided on the sheave. One end of the hoisting ropes is attached to the counterweight 16 and the other end to the car frame 18 of the elevator car. Mounted in the car frame 18 is an elevator car 20 with a load-weighing device 22 fitted under it. A load signal proportional to the load is passed via a conductor 24 to an elevator control unit 26. From the elevator control unit 26, data representing elevator functions such as starting, stopping, and speed curve, required for the control of the elevator, are supplied to the frequency converter 11 via conductor 28.

Figure 2:
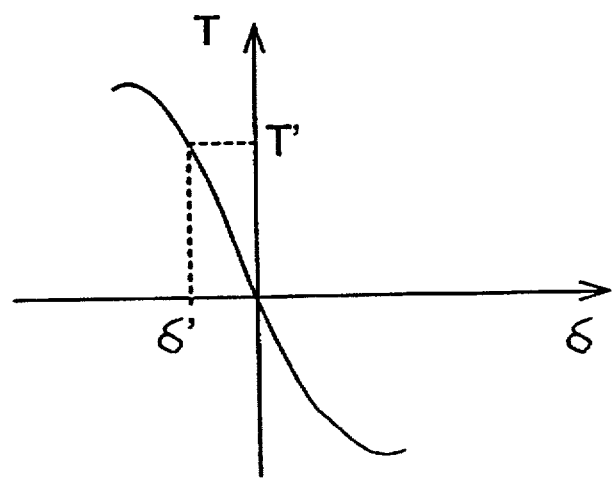
FIG. 2 presents the load torque as a function of the difference between stator and rotor fields.

In FIG. 1, the angle of the rotating magnetic field generated in the air gap by the a.c. voltage supplied into the stator windings, relative to the stator, is depicted using pointers. Pointer Gr represents the position of the magnetic field generated by the permanent magnets of the rotor, rotating with the rotor, in relation to the stator. Correspondingly, pointer Gs represents the position of the magnetic field of the stator generated by the stator windings with respect to the stator. The torque of the synchronous motor is a function of the angle $\delta$ between the pointers Gr and Gs. Hereinafter, the angle $\delta$ between Gs and Gr is designated as load angle. FIG. 2 depicts the torque of the synchronous motor as a function of the load angle, where motor drive torque T' corresponds to load angle $\delta'$.

Figure 3A:
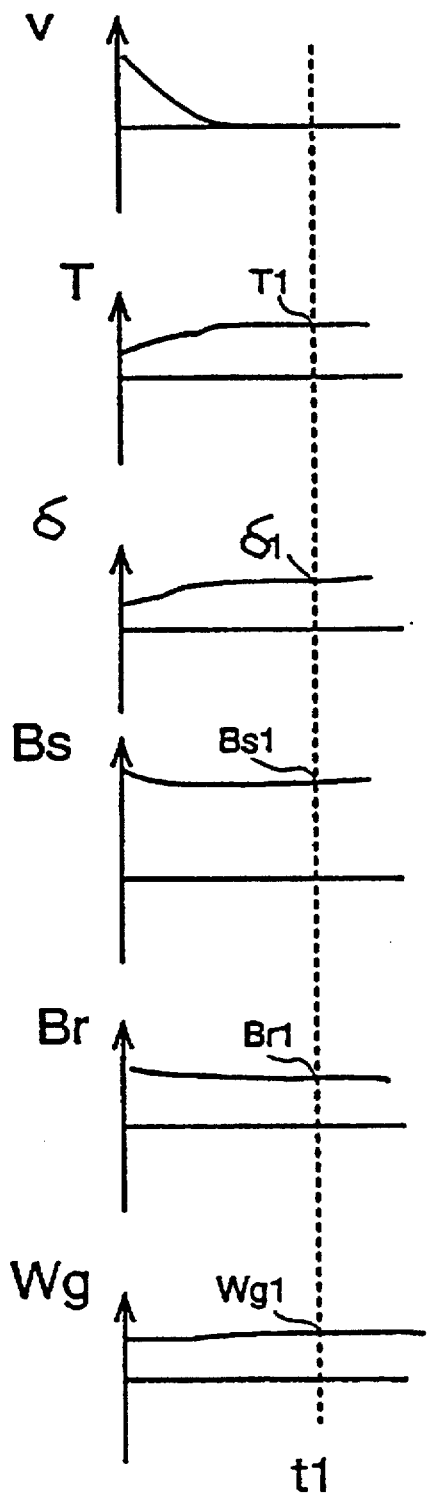
FIGS. 3A and 3B present system quantities measured in different operational conditions.
Figure 3B:
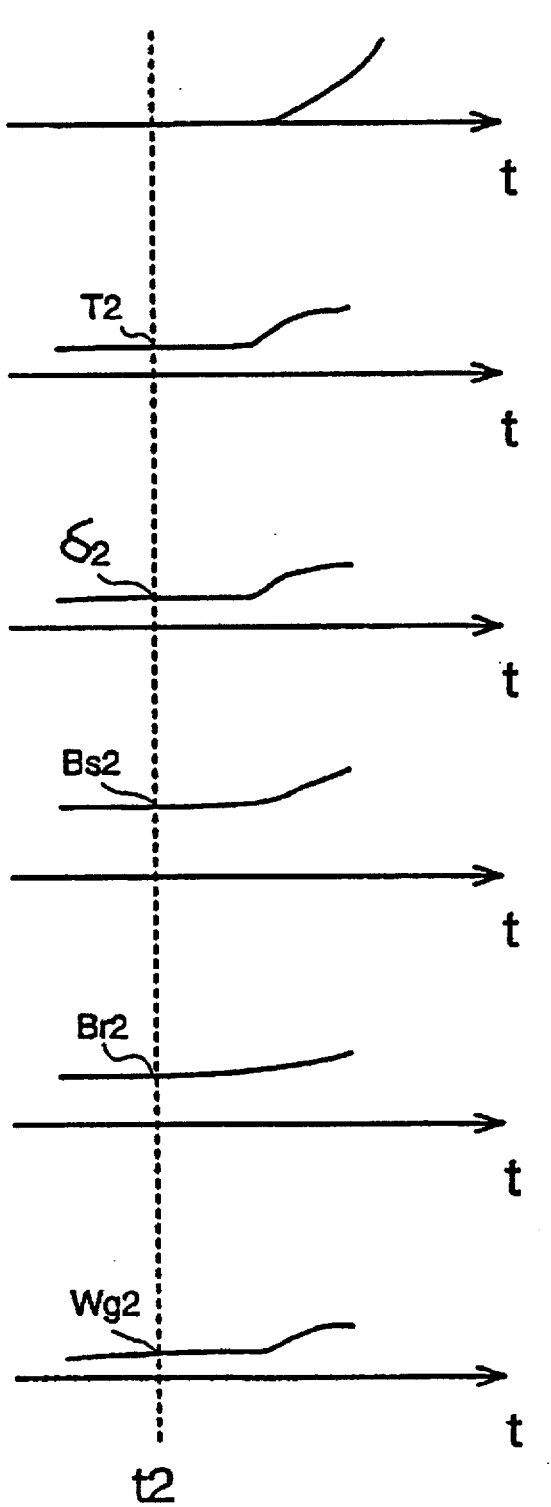

The present invention is substantially based on utilizing the interdependence of the load torque and load angle of the motor. FIGS. 3A and 3B illustrate the variations in the speed v, torque T, load angle $\delta$, stator and rotor field angles Bs and Br and load signal Wg of the motor as functions of time around the stopping moment t1 and the starting moment t2. The stator and rotor field angles Bs and Br indicate the direction of the pointers Gs and Gr representing the position of the magnetic fields of the stator and rotor, respectively, as compared to a selected reference direction. The reference direction may be e.g. the horizontal direction to the right in FIG. 1.

When the elevator stops at a landing, its speed is reduced to zero just before instant t1, which is when the brake is closed. At zero speed, the synchronous motor is fed with a d.c. current. The load torque T remains at value T1, which is sufficient to keep the elevator stationary. Accordingly, the load angle remains at value $\delta 1$, corresponding to the torque T1. On the other hand, since the frequency converter is informed about the direction Bs1 of the pointer of the magnetic field of the stator, the angle Br1 of the magnetic field of the rotor is also known at instant t1 and it can be saved in a memory storage provided in the control unit. The motor is kept stationary by means of a mechanical non-slip brake, so the rotor and its angle remain unchanged during the stoppage. However, the car load and the torque on the motor shaft may change as passengers move into and out of the elevator. The car load is represented by the load weight signal Wg, which has the value Wg1 at instant t1.

At instant t2, the elevator machinery is started and the motor must generate a torque corresponding to the load applied to the shaft. The magnitude of the torque T2 is obtained from the change that has occurred in the load weight signal, i.e. T2−T1=Wg2−Wg1. At the starting instant, the motor is fed with a d.c. current, so the frequency of the supply current is zero. The required torque determines the magnitude of the load angle δ2, giving a stator field angle Bs2=δ2+Br2, where Br2=Br1 when the rotor is in the same position as at the stopping instant, the value of this angle being read from the memory of the control unit. In the operating range normally applicable, the torque curve illustrated by FIG. 2 can be approximated by a straight line.

The frequency converter must be designed so that it permits the magnetic field angle to be read and set to a desired value for d.c. This can be done by storing the voltage values in successive memory locations, the whole cycle being divided e.g. into 256 parts. Thus, the angle of the magnetic field of the stator is simply a memory address. At the starting instant, the address is the same if the load signal has not changed. Correspondingly, the address is higher or lower if the load signal has changed. Since the motor is fed with a d.c. current at the instants of starting and stopping, it is possible to store the current angle instead of the voltage angle and use it in a corresponding manner.

The load weight signal can be advantageously used in the procedure of the invention. The load weight signal is always available because load information is needed in the elevator for other purposes as well, e.g. for overload control. The other factors needed for setting the starting torque are unchangeable: the rotor is stationary and the angle of the magnetic field generated by the permanent magnet rotor is unchanged and stored in memory, the torque applied to the shaft of the traction sheave by other than the duty load of the car, e.g. the rope load, is unchangeable during the stoppage. Therefore, accurate information about the starting torque required can be supplied to the unit controlling the frequency converter, without separate auxiliary equipment, so a starting current and a stator magnetic field angle producing the required torque can be set with the frequency converter. The load signal can also be determined by other methods known in elevator technology, e.g. by measuring the load at the end of the rope at or around the point of attachment of the rope to the elevator car or by using the load signal supplied by a brake load weigher.

In anomalous situations where the system has for some reason failed to save the rotor angle at the stopping instant, the motor is fed with a d.c. current sufficient to keep the motor stationary. The magnitude of the current required can be approximately estimated on the basis of the position and load of the elevator. After this, the brake is released and the motor is started slowly enough to permit the rotor angle to fall into the required torque range.

The invention has been described above by the aid of one of its embodiments. However, the presentation is not to be regarded as constituting a limitation of the invention, but its embodiments can be varied within the limits defined by the following claims.

We claim:

1. A method for starting elevator machinery which includes a synchronous motor fed by a frequency converter and a traction sheave connected to the motor to move the elevator car with hoisting ropes, said method comprising the steps of:

measuring an elevator load; and generating a torque corresponding to the load applied to the shaft of the elevator motor at the time of starting, wherein said generating step is achieved by, when the motor stops, feeding the motor with a d.c. current and, from the frequency converter, determining the angle of the magnetic field of the stator of the synchronous motor, determining the change of the load signal during stoppage, when the motor is started again, determining a new value of the angle of the magnetic field of the stator based on the change in the load signal and the angle of the magnetic field of the rotor which has been held constant during elevator stoppage, and adjusting the frequency converter so that a magnetic field with a direction corresponding to the new angle of the magnetic field of the stator is generated in the motor.

2. The method defined in claim 1, wherein, on the basis of the angle of the magnetic field of the stator and the load signal, the rotor angle is determined and the value of this angle is stored in memory for the time of the stoppage, when the motor is started again, the new load signal is measured and, in accordance with the new load signal and the rotor angle stored in memory, the angle of the magnetic field of the stator that is required to generate a torque corresponding to the load is determined, and the current to be supplied to the motor and the angle of the magnetic field of the stator corresponding to the required torque are generated by means of the frequency converter.

3. The method defined in claim 1, wherein the same magnetization of the synchronous motor is maintained at the instant of stopping and at the instant of starting.

4. The method defined in claim 1, wherein the synchronous motor is magnetized using permanent magnets.

5. The method defined in claim 1, wherein the load signal used is the car load signal.

6. The method defined in claim 2, wherein, when the angle of the magnetic field of the stator and/or rotor is not known due to an electrical disturbance or for some other reason, the motor is fed with a d.c. current that is sufficient to keep the motor stationary.

7. A method for controlling elevator moving machinery which includes a synchronous motor having a rotor and stator, a frequency converter for feeding current to the synchronous motor, and a controller for adjusting the characteristics of the current fed from the frequency converter to the synchronous motor, said method comprising the steps of:

determining, at the time the elevator car is initially stopped (time t1), the direction of the magnetic field created by the rotor;

sensing a starting load value at the time the elevator car is to be moved from the stopped position (time t2);

determining, at time t2, the direction of the magnetic field generated by the stator in accordance with the rotor magnetic field direction and the starting load value determined at time t2; and generating a stator magnetic field when the synchronous motor is restarted to produce a torque corresponding to the starting load value.

8. The method of claim 7, wherein the direction of the rotor magnetic field remains unchanged during elevator stoppage.

9. The method of claim 7, wherein the direction of the rotor magnetic field at time t1 is determined in accordance with the load value at time t1 and the direction of the stator magnetic field.

10. The method of claim 7, wherein the synchronous motor is fed with a DC current while the elevator car is stopped.

11. The method of claim 10, wherein the level of DC current fed to the elevator car is adjusted in accordance with changes in load.

12. The method of claim 11, wherein DC current values are stored in successive memory locations such that a change in the direction of the stator magnetic field is indicated by a change in the memory location of the DC current fed to the synchronous motor.

13. An apparatus for moving a stopped elevator car comprising:

- a synchronous motor having a rotor and a stator, the rotor being stopped at time t1 and held constant when the elevator is stopped;
- a frequency converter for feeding current to the stator of said synchronous motor;
- a load sensor for sensing a load value at the time the elevator car is to be moved from the stopped position (time t2); and
- a controller for adjusting the characteristics of the current fed from the frequency converter to the synchronous motor, said controller determining the direction of the stator magnetic field at time t2 in accordance with the sensed load value and the direction of the rotor magnetic field at time t1, said controller controlling said frequency converter to create, at time t2, a stator magnetic field at the determined direction to thereby create a torque corresponding to the load at time t2.

14. The apparatus of claim 13, wherein the direction of the rotor magnetic field at the time the elevator is stopped (time t1) is determined in accordance with the load value at time t1 and the direction of the stator magnetic field at time t1.

15. The apparatus of claim 13, wherein the stator of said synchronous motor is fed with DC current while the elevator car is stopped.

16. The apparatus of claim 15, wherein the level of DC current fed to the synchronous motor during stoppage is adjusted in accordance with changes in load.

17. The apparatus of claim 16, wherein DC current values are stored in successive memory location so that a change in direction of the stator magnetic field is indicated by a change in the memory location of the DC current fed to the synchronous motor.

* * * * *